US005280571A

United States Patent [19]
Keith et al.

[11] Patent Number: 5,280,571
[45] Date of Patent: Jan. 18, 1994

[54] METHOD AND APPARATUS FOR LINE DRAWING BY INTERLEAVING MULTIPLE PROCESSORS

[75] Inventors: Michael Keith, Holland, Pa.; Yaron Minsky, Kendall Park, N.J.

[73] Assignee: Intel Corporation, Hillsboro, Oreg.

[21] Appl. No.: 829,919

[22] Filed: Feb. 3, 1992

[51] Int. Cl.⁵ .............................. G06F 15/62
[52] U.S. Cl. .............................. 395/143; 395/163
[58] Field of Search .............. 395/140–1, 143, 121, 127, 128, 162, 163

[56] References Cited

U.S. PATENT DOCUMENTS

| 4,837,563 | 6/1989 | Mansfield et al. | 395/143 X |
| 5,146,554 | 9/1992 | Statt | 395/128 X |

OTHER PUBLICATIONS

Foley et al. Computer Graphics Principles and Practice (1990) pp. 855–921, 72–91, 613.
"Fundamentals of Interractive Computer Graphics", Foley and VanDam, pp. 433–436, 1982.

Primary Examiner—Gary V. Harkcom
Assistant Examiner—Almis Jankos
Attorney, Agent, or Firm—Carl L. Silverman; William H. Murray; Daniel H. Golub

[57] ABSTRACT

A method and apparatus for creating computer generated lines using a single or multiple instruction multiple data processor in conjunction with a modified version of Bresenham's line drawing algorithm wherein the speed of the operation is enhanced by allowing the processor to perform its memory writes in page mode.

10 Claims, 1 Drawing Sheet

METHOD AND APPARATUS FOR LINE DRAWING BY INTERLEAVING MULTIPLE PROCESSORS

BACKGROUND

The present invention is directed to a method and apparatus for drawing computer generated lines using Bresenham's line drawing algorithm. More particularly, the present invention is directed to a method and apparatus for drawing lines using single (or multiple) instruction multiple data processors known as SIMD's (or MIMD'S) respectively.

In a SIMD processor, multiple tasks may operate on multiple data sets, while each task shares a single instruction set. A SIMD processor capable of operating on N data sets may generally function N times faster than a single processor if the same program is being used to operate on each of the N data sets. Accordingly, the performance of the SIMD may be optimized if each of the N tasks uses the same algorithm or instruction sequence. A SIMD processor differs from a multiple instruction multiple data processor ("MIMD") in that an MIMD is capable of operating on multiple data sets while using separate or distinct instruction sequences.

One type of algorithm which may be applied to multi-tasking processors is Bresenham's line drawing algorithm. Since computer generated lines are limited to representations based on discrete pixel locations, it often happens that the mathematical location of a point will differ from the location of the point on the screen. Bresenham's algorithm is directed towards this problem and is used for choosing pixel locations which tend to minimize differences between an actual mathematical line and a computer generated representation of such a line. Based on its determination of the error by which a drawn point on a line will deviate from the actual mathematical position of the point, Bresenham's algorithm will determine whether the next drawn point should be the one directly to the right of or one above and to the right of the last drawn point. In determining the error for any particular point, Bresenham's algorithm uses a composite error figure which has been incremented or decremented with each preceding point. The basic Bresenham algorithm to draw a line from $(X_1, Y_1,)$ to $(X_2, Y_2)$ can be described as shown in Table I below:

TABLE I

```
1   dx = x2−x1
2   dy = y2−y1
3   inc1 = 2 * dy
4   inc2 = 2 * (dy−dx)
5   e = 2*dy − dx
6   x = x1
7   y = y1
8   for dx times
    {
9       draw point at x, y
10      if    (e < o)
11            e = e + inc1
12      else
13            e = e + inc2
14            y = y + 1
15      x = x + 1
    {
```

A mathematical analysis of Bresenham's Algorithm can be found in "Fundamentals of Interactive Computer Graphics", by Foley and VanDam.

For a multi-tasking processor capable of operating on N data sets, a typical application of Bresenham's algorithm might involve using a separate task to draw each (1/N)th of the line. A SIMD processor could be employed using this method, as each of the N tasks could be made to use the same instruction sequence.

This method is illustrated in FIG. 1, where the line to be drawn (10) is divided into N segments labelled 10a, 10b, ... 10n. Each of the N processors is used to draw one of these N segments, by first calculating the position of the first point of its respective segment, and thereafter by calculating successive points on its respective segment using, for example, Bresenham's algorithm.

The drawback in using the method shown in FIG. 1 to draw lines using a SIMD or MIMD processor, is that the optimal speed is not achieved. The loss of speed is attributable to the memory addressing mode which must be used to write and store the calculated points in the computer memory.

Computer memory chips are typically divided into sections called pages. Since, in the method shown in FIG. 1, the N points being calculated at any particular time are each separated by a distance equal to (1/N)th of the line, the N points are not contiguous and will therefore not typically be written onto the same page in memory. The fact that each of the N processors must write to a difference page in memory works to significantly slow the line generating process of FIG. 1.

In a different mode known as "page mode", memory writes are not made to multiple pages but instead only to a single page at a time. Writing to memory in page mode is significantly faster than writing to separate pages in memory.

It is an object of the present invention to make optimal use of SIMD architecture by operating on multiple data sets using the same instruction sequence.

It is a further object of the present invention to use SIMD architecture in a manner which capitalizes on the speed achievable by writing to memory in page mode.

SUMMARY OF THE INVENTION

A method for generating a line having m segments by calculating the value of the points which form the first segment, writing the values generated into a single page in memory, and repeating these steps for segments 2 through m.

DETAILED DESCRIPTION OF THE PREFERRED EMBODIMENT

Figure 1:
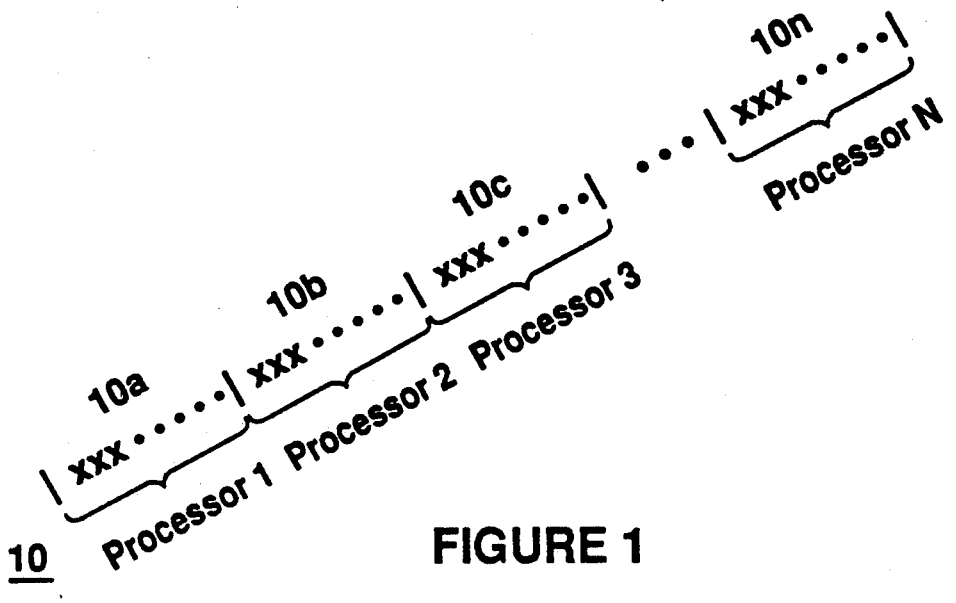
FIG. 1 shows a line drawing method involving memory writes to multiple pages.
Figure 2:
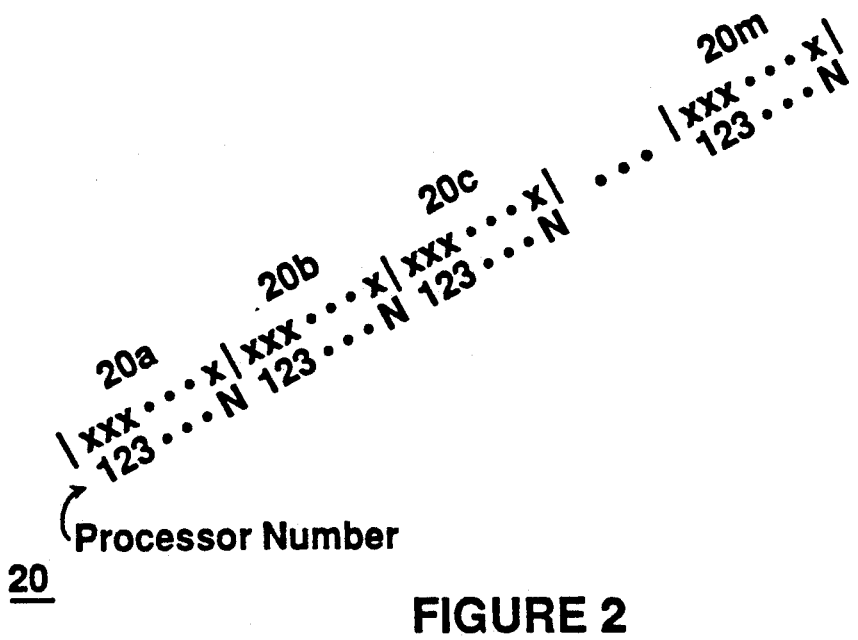
FIG. 2 shows a line drawing method according to the present invention.

FIG. 2 shows the line drawing method of the present invention. Line 20 is formed from line segments 20a through 20m, each line segment having N points. According to the present invention, N processors function to first calculate and write all points in first segment 20a, then all points in second segment 20b, and so on. Thus, instead of using each processor to calculate the points in a single segment, as shown in FIG. 1, the points drawn by the N processors are interleaved. That is, the first point of line 20 is drawn by processor 1, the next by processor 2, and so on. After the first point by processor N comes the second point drawn by processor 1, the second point drawn by processor 2, and so on. If the points of the line are numbered 0, 1, 2, and so on, then processor k draws all points whose number equals k MOD N.

In the present invention, each of the N processors executes a "scaled" Bresenham algorithm in which the error increment and position increments are scaled by a factor of N. In connection with a line extending from an initial point ($x_1$, $y_1$) to an end point ($x_2$, $y_2$), a "scaled" version of this algorithm which would operate in one of the N processors to draw the kth point in segment 20a and then each Nth point thereafter for segments 20b through 20m is shown in Table II below:

TABLE II

```
1   dx = x2−x1;
2   dy = y2−y1;
3   inc1 = 2 * dy;
4   inc2 = −2 * dx;
5   e = −dx;
6   x = x1;
7   y = y1;
// Step by 'proc' units & plot first point
8   if (proc <= dx) // check for short line
    {
9       step (proc);
10      point (x,y);    // plot first point
    }
        // Now step by n pixels and plot the
        remaining // points.
11  for (i=n, i<dx−proc; i=i+n)
    {
12      step (n);
13      point (x,y);
    }
    where step ( ) is a function defined as follows:
14  step (k)
    {
15      x = x + k;
16      e = e + k * inc1;
17      while (e >=0)
        {
18          y = y + 1;
19          e = e + inc2;
        }
    }
```

In the above code, 'proc' stands for the processor's ID number, which would range from 0 to N-1, N being the total number of processors. The above code could run under either SIMD or MIMD architecture. If the architecture is MIMD, then each processor runs the above code. In the SIMD architecture, all N processors must run the same line of code at the same time. More specifically, they must each go through any loop the same number of times. It should be noted, however, that although each processor must step through the code, it need not execute it. In the SIMD architecture, it is possible to decide which processors are active and which are not.

In this vein, the for loops should be interpreted as follows: the loop continues to run as long as any of the processors decide to continue. However, those that do not decide to continue are turned off for the rest of the loop. As soon as all are finished, the loop actually ends and goes on to the next line of code.

Referring still to Table II, lines 1 through 7 set up values necessary for the running of the later code. Lines 8 through 10 plot the first point for a given processor, i.e., the appropriate point in the first segment, 20a, of FIG. 2. Lines 14 through 19 then move by steps of N, making the Pth processor draw the N+Pth pixel, then the 2N+Pth pixel, and so on. To make the N pixel step, the algorithm first increments e, the error count, by N times the first increment, inc1 (standard to Bresenham's algorithm). X, the x coordinate, is increased by N pixels (instead of 1 for Bresenham's). Y is then incremented using the standard Bresenham test in lines 17 through 19.

Since the line has a total length which will often not be a multiple of the number of processors, the final segment may have less than N points, in which case less than N processors will be working. Those processors for which the next point would be beyond the end of the line turn off, letting the other processors write out the last points. Then all of the processors turn off, and the loop ends.

By in this way using the P processors to generate the points in the same order that the standard Bresenham's algorithm does (i.e., starting at one endpoint and moving sequentially to the other), the invention minimizes the amount of time it takes to draw a line by using the extra processing power of a SIMD or MIMD machine and at the same time minimizing the number of page misses. The number of page misses in this setup is exactly the number of different pages which the line has points lying in. In other words, if the line stretches across M pages, one end point lying in the Lth page, the other lying in the L+Mth page, then first all points in the Lth page are written out, then all points in L+1th, and so on, until the L+Mth page. This way, page misses only happen when the line crosses from one page to another (and at the first page, since the first write is likely to be a page miss).

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for generating a pixel representation of a line, comprising the steps of:
    (a) receiving a pair of coordinates ($x_1$, $Y_1$) corresponding to an initial point of said line and a pair of coordinates ($x_2$, $y_2$) corresponding to an end point of said line;
    (b) generating parameter values corresponding to Bresenham's algorithm in accordance with said coordinates ($x_1$, $y_1$) and ($x_2$, $y_2$);
    (c) concurrently generating a first pixel with a first processor and generating a second pixel with a second processor by applying Bresenham's algorithm with said first processor to generate said first pixel and applying Bresenham's algorithm with said second processor to generate said second pixel;
    (d) storing said first and second pixels in a computer memory in page mode;
    (e) concurrently generating a third pixel with said first processor and generating a fourth pixel with said second processor by applying Bresenham's algorithm with said first processor to generate said third pixel and applying Bresenham's algorithm with said second processor to generate said fourth pixel, wherein said first and second processors are processors of a multi-tasking processor; and
    (f) storing said third and fourth pixels in a computer memory in page mode, wherein:
    said first, second, third, and fourth pixels correspond to said line, and
    said first and third pixels are interleaved with said second and fourth pixels.

2. The method of claim 1, wherein said multi-tasking processor is a single-instruction, multiple-data processor.

3. The method of claim 1, wherein said multi-tasking processor is a multiple-instruction, multiple-data processor.

4. The method of claim 1, wherein step (a) further comprises the step of generating said first pixel with said first processor in accordance with a composite error figure.

5. The method of claim 4, wherein step (a) further comprises the step of generating said composite error figure in accordance with Bresenham's algorithm.

6. An apparatus for generating a pixel representation of a line, comprising:
   (a) means for receiving a pair of coordinates $(x_1, y_1)$ corresponding to an initial point of said line and a pair of coordinates $(x_2, y_2)$ corresponding to an end point of said line;
   (b) means for generating parameter values corresponding to Bresenham's algorithm in accordance with said coordinates $(x_1, y_1)$ and $(x_2, y_2)$;
   (c) a first processor for generating a first pixel and a third pixel;
   (d) a second processor for generating a second pixel and a fourth pixel;
   (e) means for concurrently generating said first pixel with said first processor and generating said second pixel with said second processor by applying Bresenham's algorithm with said first processor to generate said first pixel and applying Bresenham's algorithm with said second processor to generate said second pixel;
   (f) means for storing said first and second pixels in a computer memory in page mode;
   (g) means for concurrently generating said third pixel with said first processor and generating said fourth pixel with said second processor by applying Bresenham's algorithm with said first processor to generate said third pixel and applying Bresenham's algorithm with said second processor to generate said fourth pixel, wherein said first and second processors are processors of multi-tasking processor; and
   (h) means for storing said third and fourth pixels in said computer memory in page mode, wherein;
   said first, second, third, and fourth pixels correspond to said line, and
   said first and third pixels are interleaved with said second and fourth pixels.

7. The apparatus of claim 6, wherein:
said computer memory comprises a plurality of pages, and
said first processor stores said first pixel in a first page of said memory and said second processor stores said second pixel in said first page.

8. The apparatus of claim 6, wherein:
said computer memory comprises a plurality of pages.

9. The apparatus of claim 6, wherein said first processor generates a composite error figure used in generating said first and third pixels.

10. The apparatus of claim 9, wherein said first processor generates said composite error figure in accordance with Bresenham's algorithm.

* * * * *